(12) United States Patent
Gordon (10) Patent No.: US 8,131,592 B2
(45) Date of Patent: *Mar. 6, 2012

(54) METHOD AND SYSTEM FOR PROVIDING TARGETED CONTENT WITH VERIFICATION INFORMATION

(75) Inventor: Whitten Gordon, Omaha, NE (US)

(73) Assignee: Sojern, Inc., Omaha, NE (US)

( * ) Notice: Subject to any disclaimer, the term of this patent is extended or adjusted under 35 U.S.C. 154(b) by 687 days.

This patent is subject to a terminal disclaimer.

(21) Appl. No.: 12/150,138

(22) Filed: Apr. 25, 2008

(65) Prior Publication Data
US 2009/0222347 A1 Sep. 3, 2009

Related U.S. Application Data

(60) Provisional application No. 60/926,663, filed on Apr. 27, 2007.

(51) Int. Cl.
*G06Q 40/00* (2006.01)
(52) U.S. Cl. ................................. 705/14.4; 705/14.49
(58) Field of Classification Search .............. 705/10–44
See application file for complete search history.

(56) References Cited

U.S. PATENT DOCUMENTS

| | | | |
|---|---|---|---|
| 3,970,332 A | 7/1976 | Alford, Jr. | |
| 5,855,006 A * | 12/1998 | Huemoeller et al. | 705/9 |
| 6,285,991 B1 * | 9/2001 | Powar | 705/76 |
| 6,804,659 B1 | 10/2004 | Graham et al. | |
| 6,983,272 B2 | 1/2006 | Davis et al. | |
| 7,035,812 B2 | 4/2006 | Meisel et al. | |
| 7,050,986 B1 * | 5/2006 | Vance et al. | 705/5 |
| 2004/0245335 A1 | 12/2004 | Al Amri | |
| 2005/0258231 A1 | 11/2005 | Wiater | |
| 2006/0271552 A1 | 11/2006 | McChesney et al. | |
| 2007/0185982 A1 | 8/2007 | Nakanowatari et al. | |

* cited by examiner

*Primary Examiner* — Frantzy Poinvil
(74) *Attorney, Agent, or Firm* — Suiter Swantz pc llo (57) ABSTRACT

The present disclosure is a method and system for providing targeted content with verification information. A method for providing targeted content with verification information may include receiving data associated with verification information, the receiving of data associated with verification information including time information and location information. The method may include retrieving content related to verification information, the content being based upon time information and location information; and generating verification information, the verification information including content related to the verification information and based upon the time information and location information.

7 Claims, 5 Drawing Sheets

METHOD AND SYSTEM FOR PROVIDING TARGETED CONTENT WITH VERIFICATION INFORMATION

CROSS REFERENCE TO RELATED APPLICATION

The present application claims the benefit under 35 U.S.C. §119(e) of U.S. Provisional Application Ser. No. 60/926,663, filed Apr. 27, 2007. Said U.S. Provisional Application Ser. No. 60/926,663 is herein incorporated by reference in its entirety.

TECHNICAL FIELD

The present invention relates generally to the field of targeted content delivery and more particularly to a method and system for providing targeted content with verification information.

BACKGROUND

Verification information, including a ticket, confirmation document, boarding pass and the like may be utilized for verification of identity, reservation, transaction, access and the like. Verification information, hereinafter referred as a pass, may include a date, time, location and other information. The pass may further include a bar code or similar authentication to verify authenticity of the pass.

A pass may be produced by a distributor of the pass. For example, when purchasing passes for a concert, the distributor of the passes may mail the passes produced by the distributor to the purchaser. Alternatively, a purchaser may purchase passes by accessing an on-line, web-based system. After providing an authenticated entry to request the verification information, usually through a secure login and password, a user may retrieve the pass. The pass may be presented in a printable form including name, date and authentication information, such as a bar code, whereby a user may print the one or more passes to gain entry into the flight, event and the like.

SUMMARY

The present disclosure is directed to a method and system for providing targeted content with verification information. A method for providing targeted content with verification information may include receiving data associated with verification information, the receiving of data associated with verification information may include time information and location information; retrieving content related to the verification information, the content being based upon the time information and the location information; and generating verification information, the verification information including targeted content related to the verification information and based upon the time information and location information.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in accompanying drawings.

Referring to FIGS. 1-5, embodiments of a method and system for providing targeted content with verification information are shown. Targeted content may refer to customized or personalized content which has been gathered, assembled, altered or filtered to particular specifications, such as a location parameter and time parameter. For example, a large number of pieces of content may be reduced to a small number of pieces of content based upon particular specifications, including a location parameter and time parameter. Targeted content may also be filtered on the basis of gender, travel history, user interests and the like. Advantageously, the targeted content may be supplied with verification information to provide an efficient and convenient interface for delivery of the targeted content. Verification information may be items which are regularly utilized, such as boarding passes, tickets, reservation confirmation documents, automated teller machine receipts, sales receipts and the like.

One embodiment of the method and system for providing targeted content with verification information is providing targeted content with a boarding pass. While an on-line boarding pass check-in process improves efficiency for passengers and airline personnel, it does not provide helpful information to passengers related to their interests, trip needs, or trip destination. As a result, most boarding passes are discarded by passengers at, or shortly after, boarding the airplane because they contain no information of value except for seat assignment or boarding group.

Additionally, due to financial pressures, airlines are continually looking for additional forms of revenue by leveraging various airline assets. One form of revenue for airlines is advertising. Airlines have significantly increased advertising on airplanes in such places as tray tables, seat back catalogs, video monitors, sick bags, and napkins. While these advertising mediums offer a large number of advertising impressions to large scale brand advertisers and product marketers, they do not provide targeted content and targeted advertising to individual passengers or like groups based on passenger profiles. These advertising mediums are also not conducive to local advertisers reaching passengers who are flying into their community because they are shown to all passengers not just the ones coming to their community. Even national advertisers have few means to reach targeted groups of passengers because the broad scale advertising available on airlines is typically shown to everyone. The boarding pass check-in process represents an area for targeted content delivery to a passenger.

Figure 1:
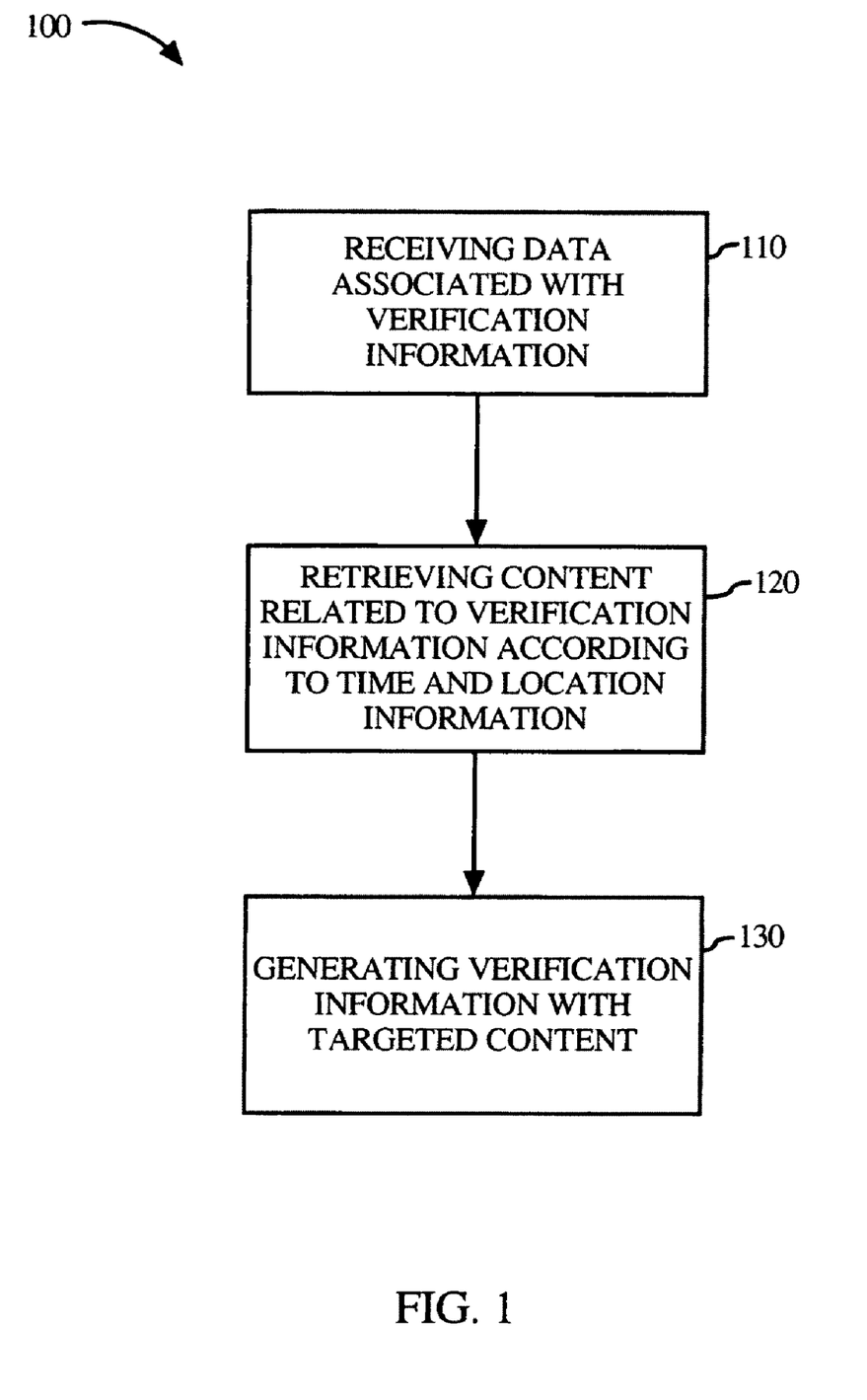
FIG. 1 depicts a method for providing targeted content with verification information.

Referring to FIG. 1, a flow chart depicting a method 100 for providing targeted content with verification information is shown. Method 100 for providing targeted content with verification information may include receiving data associated with the verification information 110. Data associated with verification information may include name or identity information, gender information, time information and location information and the like. It is contemplated that gender information may be based on identity information or a gender determination may be completed from name information. Verification information may refer to any type of information which may provide confirmation of identity, purchase, reservation, access and the like. It is contemplated that verification information may refer to a pass, ticket, confirmation document, receipt and the like. For example, verification information may refer to a boarding pass for entry onto a commercial flight. Data associated with the boarding pass may include a name, a time and date of a flight, a connecting flight, a destination and return flight(s). Method 100 may include retrieving content related to verification information and based upon time information and location information 120. Content may include information, through graphics, images and text associated and related to the verification information. Content may include advertisements and may provide informative information for users at a particular time and location. The content may be further based upon the time information and location information, providing targeted content which is of a special interest to a user. Method 100 may further include generating verification information which may include targeted content 130. While verification may include a tangible item, such as a paper pass or ticket, verification information may also be implemented in an electronic form, such as a pass code and the like.

Figure 2:
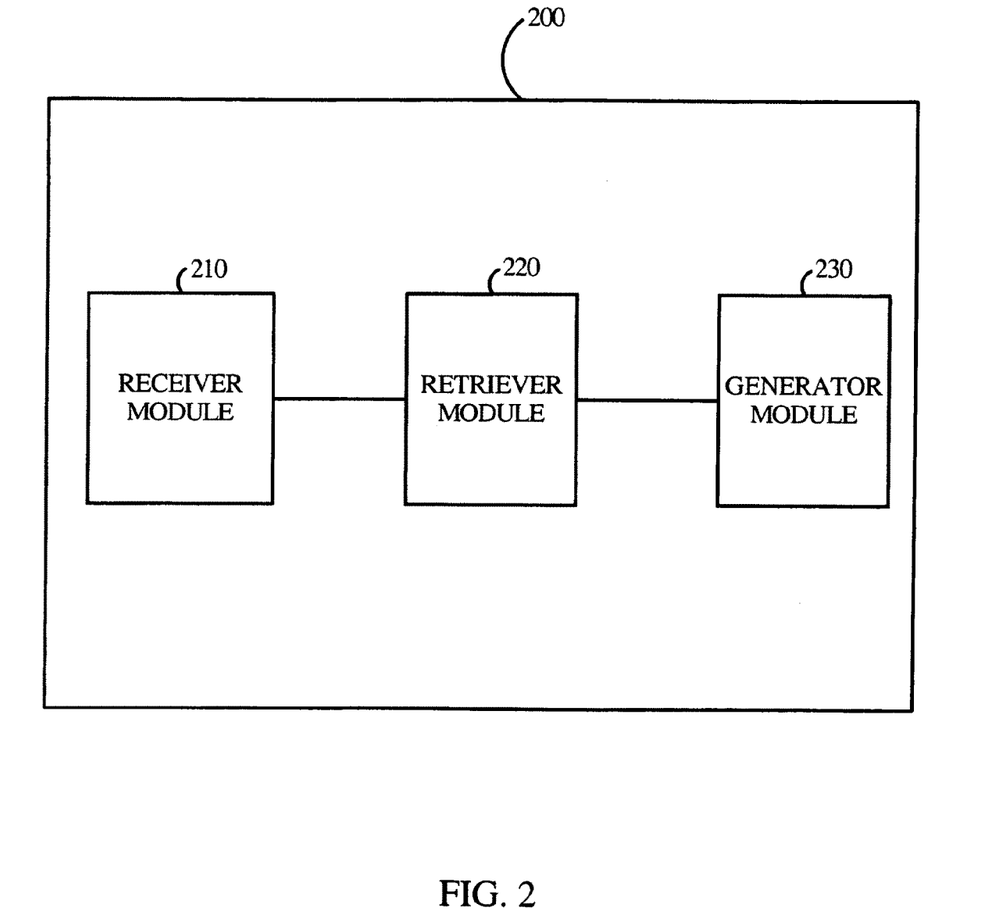
FIG. 2 depicts a system for providing targeted content with verification information.

Referring to FIG. 2, a system 200 for providing targeted content with verification information is shown. System 200 may comprise a plurality of modules which may execute one or more steps of method 100 for providing targeted content with verification information. System 200 may include a receiver module 210, a retriever module 220 and a generator module 230. Receiver module 210 may receive data associated with verification information. Receiver module 210 may include an on-line web-based server. It is contemplated that data may be parsed during a transaction associated with verification information. For example, when a user desires to print a boarding pass, they may access an airline website. As such, the airline website may retrieve a record of a reservation of the user. Receiver module 210 may parse data associated with the boarding pass, such as a name, date of flights and a destination. In a sales transaction, such as a reservation, similar data may also be parsed and received by receiver module 210. Retriever module 220 may retrieve targeted content related to verification information based upon data received from verification information, including gender information, time information and location information. Retriever module 220 may include an Internet search engine and database access. Generator module 230 may generate verification information including targeted content. It is contemplated that modules 210-230 may refer to programs of instructions, such as software code, executable by a processor, processing system, computing system and the like designated to perform one or more functions. It is further contemplated that modules 210-230 may be performed by one or more processors, computing systems and the like. Computing system may include memory for storage of content, a network interface for searching data from a worldwide network, such as the Internet, and a processing unit for executing instructions to perform functions as described by modules 210-230.

Figure 3:
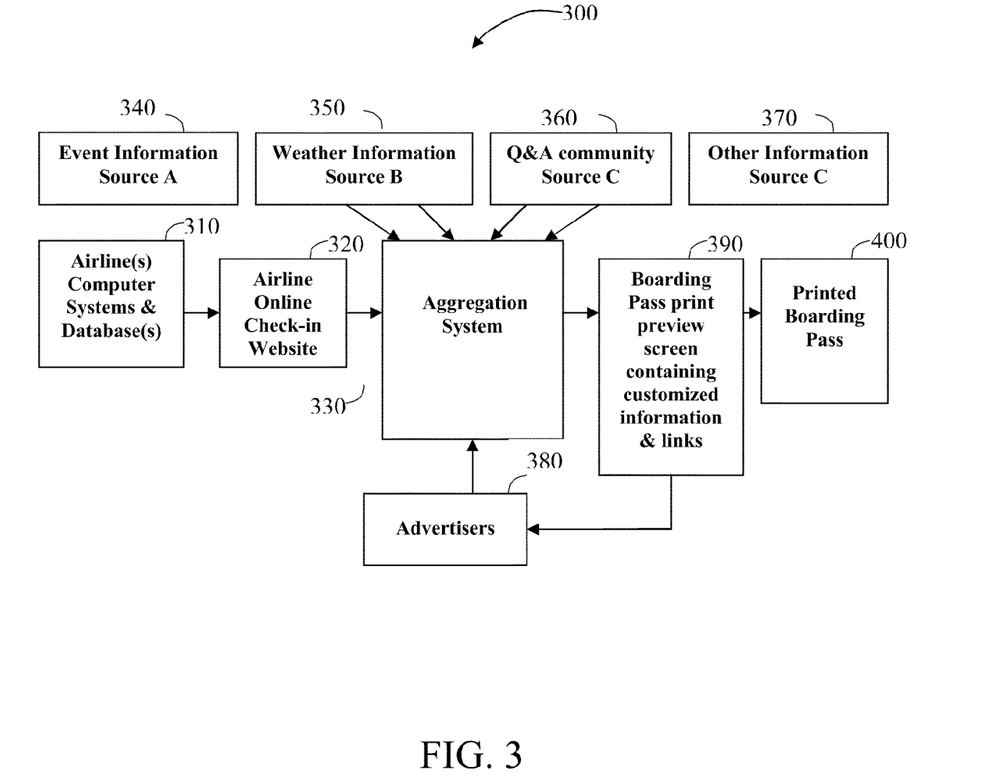
FIG. 3 depicts an exemplary system for providing targeted content with a boarding pass.

In an embodiment, a system for providing targeted content with verification information may be a system for generating customized boarding passes for airline flight access. Referring to FIG. 3, an exemplary system 300 for generating a customized boarding pass in accordance with an embodiment of the present invention is shown. System 300 may execute method 100 for providing targeted content with verification information and may be an embodiment of system 200. System 300 may include one or more airline computer systems and passenger databases 310, one or more airline websites 320, an aggregation system 330 to aggregate information sources and advertisers 340-380 that may be of interest to passengers. For example, it is contemplated that aggregation system for producing targeted content with a boarding pass is operable with a plurality of commercial airlines, such as United and American Airlines. An information or advertising source 340-380 may refer to any information source that may be accessed electronically in order to present targeted content to the specific passengers or groups of like passengers. Once information is aggregated and matched with passengers who may benefit from that information through the aggregation system 330, the information may be presented to passengers at the boarding pass print preview screen 390, providing an electronic interface of verification information. The boarding pass print preview screen 390 may include clickable links or other connections to advertisers 380 whose information was aggregated and matched with the passenger in the database and system 330. The boarding pass print preview screen 390 may also include clickable links or other connections to a plurality of other information sources 340-370 referenced on the boarding pass. The boarding pass may then be printed with the associated customized information and advertisements targeted to that particular passenger, a tangible, e.g. hard copy interface of verification information. A final printed boarding pass may contain additional customized information based upon the click behaviors of the passenger from the boarding pass print preview screen 390. This further customization may include providing the passenger with enhanced information or advertising based on the information sources viewed during the preview step, or during check-in process.

Multiple information sources 340-380 may be accessed by the aggregation system 330 such as event ticketing companies, event promoters, weather information providers, map providers, restaurant reservation providers, transportation providers, hotels, or a plurality of other sources of information that may be of interest to passengers where presentment prior to departure might be beneficial. It is contemplated that aggregation system 330 may electronically access these information sources, and it is contemplated that the sources may pay for inclusion in the system. It is further contemplated that information sources may present offers, or coupons, to particular passengers that fit a time and location parameter. Additional data concerning users may include a date of reservation, a class of service (e.g. first class), travel history and the like which may be employed to further refine target content provided to the user.

Additionally, a plurality of advertisers may provide targeted advertising messaging to specific passengers with profiles of interest. These profiles could include passenger information about such things as passenger city of origin, age, sex, propensity to travel, destination city, duration of trip, and level of airline ticket purchased. The aggregation system 330 may use this information to match advertisers and information sources with passengers who may be interested. It is contemplated that advertisers could also refine their advertising to reach only passengers who might be interested in their goods or service based on the type of product or service being sold.

For example, in an embodiment of the invention, a golf course might advertise to all male passengers between the age of 30 and 70 years traveling to San Diego who are staying at least three days. A retirement village in Las Vegas might advertise to all passengers above an age of 55 years arriving at Las Vegas during the month after their grand opening. An outdoor family entertainment center in Minneapolis may provide a coupon for free admission to children between the age of 7 to 13 years traveling to Minneapolis during the summer months. An upscale branded bagged company may advertise to all female passengers traveling in first class going to any destination during the first month after the launch of a new line of products.

It is contemplated that one or more airlines 310, or other sources providing verification information could link to the aggregation system 330. Aggregation system 330 may be associated with a particular airline, or a collection of sources providing verification information. It is further contemplated that the aggregation system 330 may include an authentication module for registration and access to a user profile. An ability to create or update a profile may further improve the information presented to that passenger. A given passenger may be able to click a link on the boarding pass preview screen 390 and update their profile in the aggregation system 330 or in the airline's frequent flier database. Profile information may include a plurality of information, including gender information, age information and travel history information. It is contemplated that the passenger may also provide user interests which may result in information and advertising that may be more valuable to that passenger. For example, in an embodiment of the invention, a 50 year old female passenger who travels regularly might select that she is interested in information about jewelry stores, craft shows, French restaurants, and all theatre events being performed during the time of trips to her destination cities. As such, targeted content on the boarding pass may include a sale at a jewelry store or the grand opening of a new French restaurant. A 30 year old male passenger who travels often may select that he is interested in information about all sporting events and concerts in the destination cities during the time of his travels. The modified profiles may further improve the quality of the targeted information and advertising to the specific passenger in the future.

Figure 4:
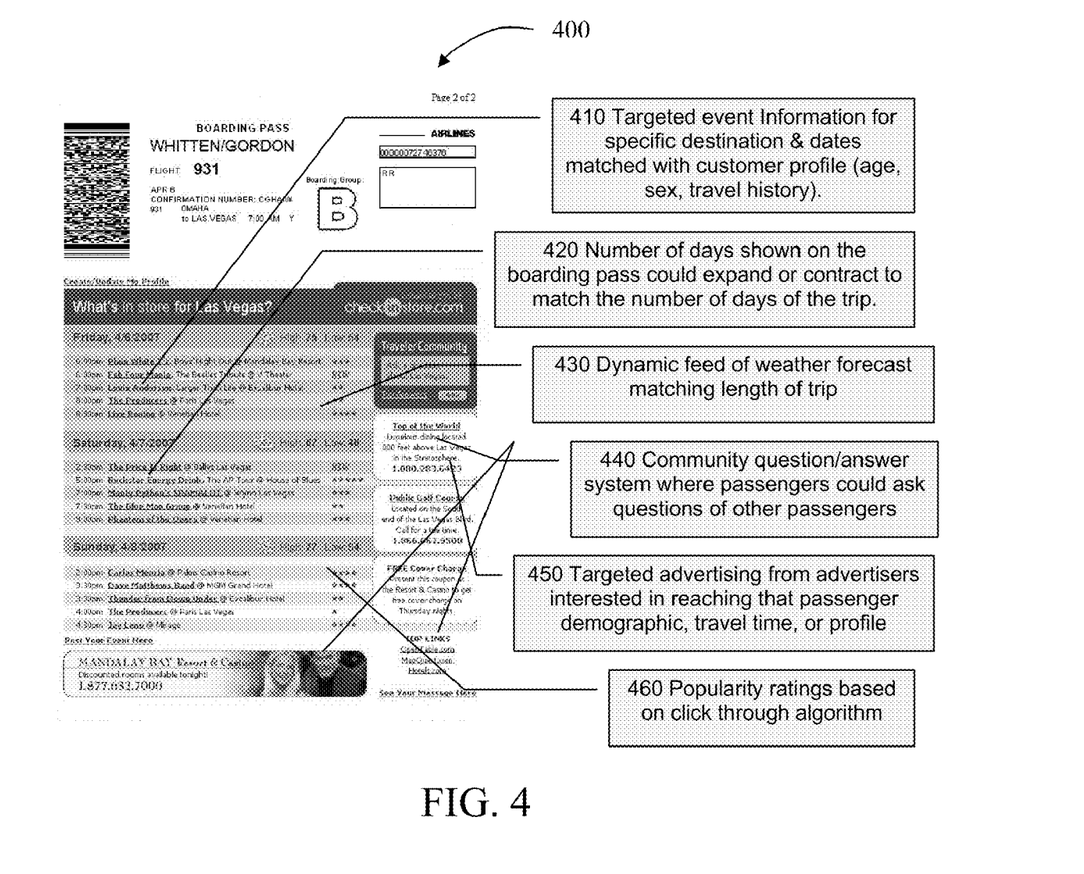
FIG. 4 depicts an exemplary boarding pass including targeted content.

Referring to FIG. 4, an exemplary diagram of a customized boarding pass 400 is shown. System 300 may produce boarding pass 400. Boarding pass 400 may include targeted event information 210 that is customized to the time and location of the user. The time and location of the user may refer to a geographical area, city, street address, airport and the like where the passenger is traveling and the time of day and particular days a person may be at the destination. The number of days, with corresponding information shown on the boarding pass, could dynamically expand or contract 220 depending on the arrival date to the destination and the departure date from the destination. Another common need when traveling is knowledge of the weather forecast for the days of a pending trip. While numerous sources of weather information exist on the Internet, they are not readily available without expending time and effort to find the specific information desired about where one is traveling. By presenting weather forecasting information that may match the probable length of the trip 430, the passenger would have valuable information without expending any effort. This information may be obtained though an electronic connection from a forecasting information source, weather source 350 of FIG. 3, saving the passenger the hassle of searching or printing the forecast separately. Targeted advertising may be purchased 450 through key word, visual, link based, search based or other advertising mechanisms that may be targeted to specific dates, destination, and traveler profiles. Advertisers may select narrow or wide targeting parameters based on the number of advertising impressions they wish to get and the degree of targeting they wish to achieve. This kind of targeting to specific traveler profiles and destinations would not be possible through traditional mechanisms of online advertising such as search or banner ads. Posted events and information could have popularity ratings 460 based on algorithms that may include the number of clicks on a specific piece of information listed on electronic boarding passes.

Even when valuable information may be provided on the boarding pass, travelers may commonly have questions regarding the location in which they are about to go. While other question and answer systems exist on the Internet, they are not targeted to travelers. Because it is difficult to find answers to questions about specific communities, except through talking to other people familiar with the specific destination, the aggregation system 330 may match people potentially able to answer questions, with those people posing the question. An electronic interface to an online question and answer system 430 may be built into the electronically presented boarding pass so that travelers going to a specific destination could ask questions of others familiar with that destination. Those interested in answering questions about destinations where they have knowledge could agree to get notifications when questions are posted that they might be able to answer. Replies could come via email or text messages depending on the preferences of the asker.

Figure 5:
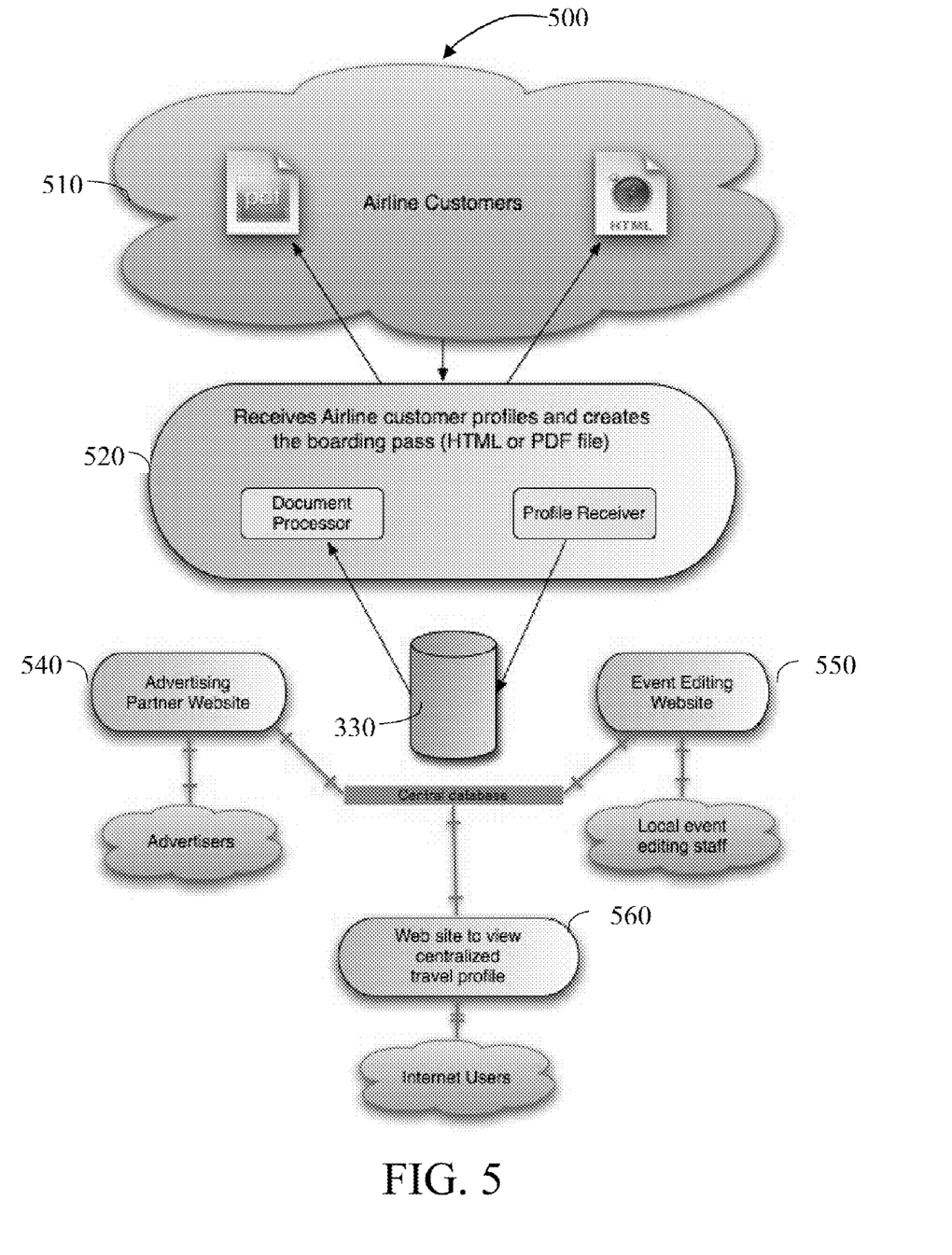
FIG. 5 depicts an exemplary architecture of a system for providing targeted content with verification information.

Referring to FIG. 5, an exemplary an exemplary architecture of a system for providing targeted content with verification information is shown. In an embodiment, airline customers check-in 510, aggregation system 530 may acquire profile information regarding customers 520. Airline passengers wishing to have a more detailed profile with preferences such as which types of restaurants or sporting events they enjoy could create or edit their profile in the database through a website to view and edit profile information 560. It is further contemplated that advertisers may have a website 540 to create advertisements and select the targeted passengers they wish to reach. This website may interact with the aggregation system 530. In a similar way, editors may have a website 550 to create, review, and update content that might be relevant to certain passengers traveling to certain destinations. This content may supplement other electronic information sources 340-370 as shown in FIG. 3. Once the matching is complete, data may be transmitted back to a document processor 520 capable of converting the matched information into a format that can be reviewed on a passenger's computer screen and printed 510. Common formats may include PDF, HTML and the like.

While an embodiment of a providing targeted content with boarding passes is described, it is contemplated that method 100 for providing targeted content with verification information may be employed with a variety of applications which employ some type of document, (electronic interface or hard copy interface) that may be utilized to verify identity, a transaction and the like. For example, method 100 may be employed with train reservations, car rental reservations, lodging reservations, concerts, sports events, movies, restaurant reservations, store receipts, automated teller machine receipts and the like. It is further contemplated that targeted advertising and targeted content related to a specific passenger profile and the destination which they are traveling may be presented to users through mobile devices in an electronic interface. Additionally, links may be provided where passengers may access the boarding pass content at a later time during the trip via a computer or mobile device to get updated content, purchase tickets, or schedule restaurant reservations. This may be available on an aircraft which includes wireless Internet access. As such, real time offers for the destination may be provided to the user by information sources. Offers may include discounts, coupons and the like in order to increase business in real-time. For example, a restaurant in an airport may target a user based upon their presence in the airport as part of a connecting flight.

Additionally, system 300 may be implemented with kiosks at airports for the printing of advertisements on the kiosk boarding pass. With the adoption of dual sided thermal printers, customized and targeted content may be printed on both sides of boarding passes. System 300 may extend to luggage tags printed for checked baggage. Currently, luggage tags are printed at the airport when bags are checked. Those tags commonly contain the name of the passenger, the destination they are headed, and a bar code containing specific details about their trip. The same technology being used on the boarding pass could also be used to customize the luggage tag with targeted offers and provide that information to the specific passenger.

System 300 may be employed with flight confirmation email messages whereby the targeted information is offered at the time of booking but converted to the point in time where the booking is made. Furthermore, the interactions between the passenger and the information on the flight booking email message may be utilized to further enhance the offers and information presented to the passenger at the point of check in on-line. This may provide a traveler behavioral targeting system that improves with each utilization of the system.

It is contemplated that the targeted content might adapt as the habits of a passenger change. On a connecting flight or return flight home from an airport where the passenger is not familiar with the airport might bring the need for airport information to the forefront. One such example is information about the restaurants at the connecting or departure airport including hours of operation and location relative to the passenger's terminal and gate of departure. Additional information related to that airport and wait times, security warnings, delays, and the like may be posted on the return boarding pass.

A boarding pass may provide an efficient and convenient location for the printing and inclusion of targeted web links or text codes for the passenger to access specific information relative to their specific trip in light of the time information, location information and/or their passenger profile. Although some of this information could be accessed through long and consuming mobile searches, it could never be accessed at the proper time, proper accuracy or speed of coordinating the specific links. One manifestation would include getting gate information at the airport before or in between flights at a connecting airport. Because this information often changes, a link or SMS code may be placed on the boarding pass that would allow the passenger to quickly excess the exact information for their specific flight. Such information may otherwise require time consuming searches with large amounts of data entry in order to retrieve on a mobile device. Another example would be real time offers at a departure or connecting airport relative to the exact time a passenger is arriving at that particular airport. For example, a parking company might offer a discounted rate on specific hours of the day when parking lots are not full. A restaurant in a connecting airport might create a "happy hour" offer because they have too few customers at a given time of day. A retailer might choose to offer specials to all female travelers who arrive with a certain coupon code on their mobile device for a given type of merchandise.

It is believed that the system of the present invention and many of its attendant advantages will be understood by the forgoing description. It is also believed that it will be apparent that various changes may be made in form, construction, and arrangement of the components thereof without departing from the scope and spirit of the invention or without sacrificing all of its material advantages. The form herein before described being merely an explanatory embodiment thereof.

What is claimed is:

1. A method, executable as a set of instructions by a processing unit, for providing targeted content for a boarding pass, comprising:
    receiving an airline reservation, the airline reservation including an origin location, a departure date, a destination location and a return date;
    receiving a set of advertisements from at least one advertiser, at least one advertisement from said set of advertisements being designated for a desired time period and a desired location;
    retrieving content related to said destination location during a time between said departure date and said return date, the destination location during a time between said departure date and said return date being acquired from said airline reservation;
    determining selected advertisements from said set of advertisements from said at least one advertiser which match said destination location between said departure date and said return date acquired from said airline reservation; and
    formatting said retrieved content and said selected advertisements for placement with a boarding pass, said boarding pass configured to allow entry for said airline reservation and include said retrieved content and said selected advertisements.

2. The method as claimed in claim 1, wherein said destination location includes a geographical city in proximity with a destination airport.

3. The method as claimed in claim 2, wherein said retrieved content includes weather forecast information for said geographical city during said time between said departure date and said return date.

4. The method as claimed in claim 1, wherein said airline reservation includes name information.

5. The method as claimed in claim 4, wherein gender information is determined from name information and said retrieved content is based upon said gender information.

6. The method as claimed in claim 2, wherein determining selected advertisements from said set of advertisements from said at least one advertiser which match said destination location between said departure date and said return date acquired from said airline reservation includes selecting advertisements in which the desired time period overlaps said time between said departure date and said return date and said desired location includes said geographical city.

7. The method as claimed in claim 1, wherein said formatting said retrieved content and said selected advertisements for placement with said boarding pass is operable for a plurality of commercial airlines.

\* \* \* \* \*

UNITED STATES PATENT AND TRADEMARK OFFICE
CERTIFICATE OF CORRECTION

| | | |
|---|---|---|
| PATENT NO. | : 8,131,592 B2 | Page 1 of 1 |
| APPLICATION NO. | : 12/150138 | |
| DATED | : March 6, 2012 | |
| INVENTOR(S) | : Whitten | |

It is certified that error appears in the above-identified patent and that said Letters Patent is hereby corrected as shown below:

Title page, item (75) Inventor should read as follows: Gordon Whitten, Omaha, NE (US)

Signed and Sealed this
Twelfth Day of February, 2013

Teresa Stanek Rea
*Acting Director of the United States Patent and Trademark Office*